Patented Mar. 15, 1932

1,849,107

UNITED STATES PATENT OFFICE

WILLIAM HENRY MOSS, OF CUMBERLAND, MARYLAND, ASSIGNOR TO CELANESE CORPORATION OF AMERICA, A CORPORATION OF DELAWARE

SYNTHETIC RESIN AND METHOD OF MAKING THE SAME

No Drawing. Application filed May 12, 1928. Serial No. 277,393.

This invention relates to coating compositions containing derivatives of cellulose and particularly to a new and improved synthetic resin for use in the same prepared from lactic acid.

An object of my invention is to provide a coating composition containing derivatives of cellulose, and particularly organic substitution derivatives of cellulose, that produces clear, homogeneous, hard, tough and light fast films.

A further object of my invention is to provide a suitable resin for lacquers containing organic substitution products of cellulose, such as cellulose acetate, which resin is compatible with the other constituents of the lacquers and which produces clear solutions which, upon drying, form films that are adherent, tough, hard and light fast.

The preparation of a lacquer containing organic derivatives of cellulose, such as cellulose acetate, as the main constituent of the lacquer base, which lacquer is to be applied to a hard, smooth surface, presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the films produced from it, both the lacquer and the films produced become cloudy and unhomogeneous.

I have found that the synthetic resins produced by the heating of lactic acid are compatible with cellulose acetate, and that when added to lacquers containing cellulose acetate, they form clear solutions that, upon drying, produce clear, hard, tough and firmly adherent films, which, in the undyed or unpigmented form, are almost colorless and fast to light.

The selection of a suitable resin for a lacquer containing the organic derivatives of cellulose presents a difficult problem because the resin must be compatible with the organic derivative such as cellulose acetate, both in solution and in the dry films, and also with softeners, pigments and dyes which may be used to produce desired effects and variations of the films. In general, a synthetic resin for this purpose would be easily prepared from preferably cheap materials; it should, of itself be practically neutral and should not easily discolor when exposed to light and be free from water soluble materials. It should be hard and solid at ordinary temperatures and its solutions from volatile solvents should dry quickly and completely when applied as a film without a long continued retention of low boiling point solvents.

I have found that the synthetic resin obtained by heating lactic acid is entirely compatible with the said cellulose derivatives, such as cellulose acetate, and that it can be added to lacquers so that there are produced therefrom clear, hard, films possessing the additional useful property of sticking to metal, wood, fabric, glass, etc., which is not inherent in the cellulose derivative itself.

I have also found that this resin can be added to cellulose derivatives when used in plastic masses and films wherever the addition of a resin is desirable or advantageous.

This resin is light colored and is entirely and completely light fast and is, therefore, useful in any application where light color and light fastness are important.

The cellulose derivative may be an inorganic ester such as cellulose nitrate, but I prefer to use organic derivatives of cellulose such as organic esters of cellulose or cellulose ethers. Examples of organic esters of cellulose are cellulose acetate, cellulose formate, cellulose propionate and cellulose butyrate. Examples of cellulose ethers are ethyl cellulose, methyl cellulose and benzyl cellulose.

Of the plastifiers or softeners that may be used the following are given by way of example: diethyl phthalate, tricresyl phosphate, triphenyl phosphate, amides such as monomethyltoluenesulphonamide, triacetin, diphenylol propane, thiocarbanilid, etc.

Examples of medium and/or high boiling solvents are ethyl acetate, ethyl lactate, tetrachlorethane, benzyl alcohol or diacetone alcohol. Obviously other suitable medium or high boiling solvents may be used. The low boiling solvents may be any one or a mixture of two or more of any of the following liquids: acetone, alcohol, (ethyl or methyl) benzene or ethylene dichloride. The pigments or dyes used may be any of the pigments or dyes ordinarily used in the paint or lacquer industry that are suitable for the purpose.

The following is an example of preparing the lactic acid resin. The resin is prepared from lactic acid, preferably 90%—$CH_3CHOH.COOH$, by heating it under reflux for several hours, and then distilling off the volatile portion. The heating and distillation may be done either under pressure or under vacuum and also at atmospheric pressure. The light yellow resin has a melting point about 30–35° C. and is probably a mixture of lactide

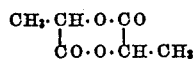

and lactyl lactyl lactic acid:

and other dehydrated and polymerized forms of lactic acid.

The resin is soluble in acetone, alcohol and other organic solvents and is entirely miscible with cellulose acetate in solution and in films. It is compatible with the usual high boiling point solvents and plasticizers or softeners also commonly used in cellulose acetate lacquers, and the lacquers produced by addition of this resin on application to metal, wood, etc., are clear, hard, well-stuck.

The resin may be dissolved alone in any suitable solvent or mixture of solvents, and the solution thus produced may be added to a solution of cellulose derivative in the same or other solvents and plasticizers, dyes, pigments, stabilizers, may be added to either or both solutions or to the mixed solution, or the resin and the cellulose derivatives may be dissolved together in the desired solvents or mixture of solvents or mixture of substances which are themselves non-solvents for cellulose acetate and resin, but which become solvents when mixed together, and dyes, pigments and plasticizers, may be added as desired, at any state in the above proceedings.

Further, I have found that the above resin is especially desirable for admixture with other synthetic resins, the said mixtures of resins being also compatible with cellulose acetate in solutions, lacquers, plastic masses and films.

Thus also the lactic acid resin may be mixed with natural resins such as kauri, pontianak, Manila, dammar, rosin and semi-artificial resins such as ester gum, all of which mixtures are compatible with cellulose acetate in solutions, lacquers, films, plastic masses, although the said natural resins and ester gum are not of themselves compatible with cellulose acetate.

These admixtures of natural and synthetic resins with the lactic acid resin may be made in any way. They may be mixed, fused or ground together, dissolved together in suitable solvents or dissolved separately and their solutions mixed together, or the said solutions mixed with cellulose acetate solutions to form lacquers; and dyes, pigments, softeners, etc., may be added as desired.

It is to be understood that the foregoing details are given merely by way of illustration and that many variations may be made therein without departing from the spirit of this invention.

Having described my invention, what I claim and desire to secure by Letters Patent is:

1. A water resistant resin formed by heating lactic acid as the sole reactant, until polymerization occurs and a resin produced.

2. A resin formed by heating lactic acid as the sole reactant under reflux for a period of time.

3. A resin formed by heating lactic acid under reflux for a period of time, said resin having a light color and a melting point of between about 30° to 35° C.

4. Method of preparing a resin comprising heating lactic acid as the sole reactant under reflux.

In testimony whereof, I have hereunto subscribed my name.

WILLIAM H. MOSS.